US006845376B1

United States Patent
Johnson (10) Patent No.: US 6,845,376 B1
(45) Date of Patent: Jan. 18, 2005

(54) METHOD FOR ACCESSING HIERARCHICAL DATA VIA JDBC

(75) Inventor: Peter Johnson, Foothill Ranch, CA (US)

(73) Assignee: Unisys Corporation, Blue Bell, PA (US)

( * ) Notice: Subject to any disclaimer, the term of this patent is extended or adjusted under 35 U.S.C. 154(b) by 440 days.

(21) Appl. No.: 10/021,525

(22) Filed: Oct. 30, 2001

(51) Int. Cl.$^7$ .............................. G06F 17/30; G06F 9/44
(52) U.S. Cl. .......................... 707/100; 707/1; 717/100; 717/115; 717/118
(58) Field of Search .................................. 707/1–3, 100, 707/10, 102–103, 200; 717/100, 115, 118; 715/513–515, 526, 500.1

(56) References Cited

U.S. PATENT DOCUMENTS

| | | |
|---|---|---|
| 5,734,887 A | 3/1998 | Kingberg et al. |
| 6,085,188 A | 7/2000 | Bachmann et al. |
| 6,128,611 A | 10/2000 | Doan et al. |
| 6,192,369 B1 | 2/2001 | Doan et al. |
| 6,202,069 B1 | 3/2001 | Blackman et al. |
| 2003/0120593 A1 * | 6/2003 | Bansal et al. ................. 705/39 |

* cited by examiner

*Primary Examiner*—Alford W. Kindred
(74) *Attorney, Agent, or Firm*—Alfred W. Kozak; Mark T. Starr; Lise A. Rode (57) ABSTRACT

The method of the present invention is useful in a computer system executing a Java application and a hierarchical database. The program executes a method for providing data access from the Java application to the hierarchical database. The method includes the steps of determining JDBC type, Java class name, and metadata values for the Java application to represent a given column in a result set on the hierarchical database. Next, there is a closing of all embedded result sets for the column.

13 Claims, 6 Drawing Sheets

FIG. 1

*FIG. 2*
JDBC DRIVER AND
EMBEDDED DATA SETS

METHOD FOR ACCESSING HIERARCHICAL DATA VIA JDBC

FIELD OF THE INVENTION

This invention provides a mechanism that enables a Java application to use Java Database Connectivity (JDBC) to access data in a hierarchical database.

BACKGROUND OF THE INVENTION

The JDBC API assumes that the database being connected to is a relational database. Relational databases have flat table structures, where tables consist solely of columns and rows.

Hierarchical databases, on the other hand, allow tables to contain embedded tables or subtables. Since such a hierarchical concept is foreign to relational databases, there is no support in the JDBC API to access the contents of subtables. This prevents Java applications from using a standard database API, which JDBC is, from accessing data in a hierarchical database. Thus, the need arises to provide a mechanism that enables a Java application to use JDBC to access data in a hierarchical database.

One prior art reference to which the method of the present invention generally relates is described in U.S. Pat. No. 6,202,069, entitled EXECUTION PARADIGM FOR ACCESSING HIERARCHICAL DATA USING AN OBJECT FRAMEWORK. This prior art reference is a method, apparatus, and article of manufacture for accessing a hierarchical database. The database is modeled into an objects framework, wherein the objects framework corresponds to application views, data structures, and data defined and stored in the database. The database is then accessed through the objects framework. A class definition tool generates class definitions for objects that encapsulate or wrap the data retrieved from the database.

The method of the present invention can be substantially distinguished from methods of the prior art. While the method of the prior art does concern accessing hierarchical data via object technology, the method of the present invention accesses the hierarchical data using the industry standard Java JDBC API. Furthermore, the method of the prior art defines a message queue as the data source, while the present invention does not.

Another prior art method to which the method of the present invention generally relates is described in U.S. Pat. No. 6,085,188, entitled METHOD OF HIERARCHICAL LDAP SEARCHING WITH RELATIONAL TABLES. This invention is directed toward a method of hierarchical LDAP searching in an LDAP directory service having a relational database management system (DBMS) as a backing store. According to the invention, entries in a naming hierarchy are mapped into first and second relational tables: a parent table, and a descendant table. These tables are used to "filter" lists of entries returned from a search to ensure that only entries within a given search scope are retained for evaluation. Thus, for example, the parent table is used during an LDAP one level search, and the descendant table is used during an LDAP subtree search. In either case, use of the parent or descendant table obviates recursive queries through the naming directory.

The prior art method of U.S. Pat. No. 6,085,188 concerns a mechanism for mapping hierarchical LDAP (Lightweight Directory Access Protocol—IBM) data to a flat relational database, and then using the relational database to do queries on the LDAP data. On the other hand, the method of the present invention concerns viewing hierarchical data through what was designed to be a relational database API.

Still another prior art method to which the method of the present invention generally relates is detailed in U.S. Pat. No. 6,128,611, entitled INTERNET-ENABLED GENERIC APPLICATION PROGRAM FOR ACCESSING HIERARCHICAL DATA. This prior art reference is a method, apparatus, and article of manufacture for accessing a hierarchical database. An objects framework models the database as one or more objects. An Internet-enabled generic application program accesses the database via the objects framework. The prior art method of U.S. Pat. No. 6,128,611 introduces an Internet-enabled generic application program for accessing hierarchical databases, such as an IMS.TM (Information Management System—IBM). database, by modeling the database into an objects framework and then accessing the database via the objects framework using standard tools, such as the DL/I.TM. query language for the IMS.TM. database. The Internet-enabled generic application program dynamically builds a DL/I.TM. query string based on web browser inputs. The generic application program loads the objects framework to instantiate IMS.TM. objects and dynamically constructs DL/I.TM (object system in objects framework—IBM). calls to access the IMS.TM. database. The prior art method offers improved IMS.TM. application programming productivity by supporting IMS.TM. business objects and data objects, by eliminating complicated DL/I.TM. programming, and by supporting use of object-oriented programming tools.

The method of U.S. Pat. No. 6,128,611 is related to the above-mentioned prior art references and uses the framework defined by the above-mentioned prior art references to define a web-based program for retrieving the hierarchical data. This prior art method essentially defines a new API, using C++ objects, to access the data. The method of the present invention accesses the hierarchical data using the industry standard Java JDBC API and does not need to define a new API.

Still another prior art method to which the method of the present invention generally relates is detailed in U.S. Pat. No. 5,734,887, entitled METHOD AND APPARATUS FOR LOGICAL DATA ACCESS TO A PHYSICAL RELATIONAL DATABASE. In this reference, Logical Data Access to the physical structure of a relational database is provided for one or more applications. Applications are developed using the logical entity types and logical entity type attribute names as described in a logical data model. The Applications then use a Logical Data Access Interface to access each of the required physical relational database tables via the Logical Data Access Layer. Applications then use logical entity type and logical entity type attribute names as specified in the Logical Data Model in making Logical Data Requests to the Logical Data Access Layer. The Logical Data Access Layer provides a set of functions for allowing an Application to control and manage a database, build and execute database queries and interface with the physical database. The Logical Data Access Layer determines which of the physical tables and associated columns are required to satisfy the Application request and then build one or more database query statements containing the appropriate physical table and column names.

The method of U.S. Pat. No. 5,374,887 concerns defining a logical layer above a relational database. Applications would access the logical layer, which would, in turn, access the proper data in the relational databases.

The method of the present invention, on the other hand, views data in a hierarchical database by using a relational database API. Java Data Base Connectivity (JDBC) is both a specification and an API. The JDBC specification details how the API is to behave for all relational databases. Thus, the JDBC specification details how to handle result sets, and columns in result sets that contain all kinds of data (such as integers, strings, etc.). For example, the JDBC specification details the behavior of the JDBC driver for when a column contains an integer value. The JDBC specification does not detail how hierarchical data is handled, but this handling is now the subject of the presently described invention.

SUMMARY OF THE INVENTION

It is therefore an object of the present invention to provide a mechanism that enables a Java application to use JDBC to access data in a hierarchical database.

Still another object of the present invention is to enable a Java application to use JDBC to access chaptered rowsets as defined by OLE DB.

Still another object of the present invention is to enable a Java application to use JDBC to access the metadata for hierarchical data and chaptered rowsets.

The method of the present invention is useful in a computer system executing a Java application and a hierarchical database. The program executes a method for providing data access from the Java application to the hierarchical database. The method includes the steps of determining JDBC type, Java class name, and metadata values for the Java application to represent a given column in a result set on the hierarchical database, and then next, closing all embedded result sets for the column.

The described method essentially is how to handle hierarchical data within the framework of the JDBC API. That is, one does not need to change or add to the JDBC API to support hierarchical data. What is done here is to indicate what additions are required to the JDBC specification to get hierarchical data to work. This means the method has to specify all areas affected by hierarchical data being present. The resultant method will be seen in FIGS. 3, 4, 5 and 6. This is all of the extra information needed (beyond the JDBC specification) to illustrate how hierarchical data is handled by a JDBC driver. The method contains all of the information necessary to build such a driver. A "handle in normal fashion" statement means to follow the method outlined in the JDBC specification.

Still other objects, features and advantages of the present invention will become readily apparent to those skilled in the art from the following detailed description, wherein is shown and described only the preferred embodiment of the invention, simply by way of illustration of the best mode contemplated of carrying out the invention.

GLOSSARY OF RELEVANT ITEMS

1. API: This represents an application programming interface. A set of routines used by an application program to direct the performance of procedures by the computer's operating system.
2. C++: An object-oriented version of the C programming language developed in the early 1980's at Bell Laboratories, and adopted by a number of vendors.
3. C++OBJECTS: Objects define in software written in the C++ language.
4. DESCENDANT: In object-oriented programming, a class (group) that is a more specialized form of another higher level class, thus, a descendant table would be a mare specialized form of a higher level table, such as a parent table.
5. DL/I.TM: This represents an object in an application's views database which is the root of an object's framework and a root for a collection of application views in the IBM information management system database.
6. DMSII: This represents a data management system formulated by the Unisys Corporation of Blue Bell, Pa.
7. DRIVER (JDBC): This is a software program that implements the JDBC specification.
8. EMBEDDED RESULT SET (FOR THE COLUMN): A result set used to represent hierarchical data for a level other than the outermost parent level. An embedded result set always represents the value of a column in a parent result set.
9. EMBEDDED RESULT SET OBJECTS: Once or more objects that represent embedded result sets.
10. FLAT-FILE DATABASE: A database that takes the form of a table, where only one table can be used for each database. A flat-file database can only work with one file at a time.
11. getObject method: See Glossary item #49.
12. HIERARCHICAL DATABASE: A database in which records are grouped in such a way that their relationships form a branching tree-like structure. This type of database structure, most commonly used for with databases for large computers, is well-suited for organizing information that breaks down logically into successively greater levels of the table.
13. IMS.TM: This represents the information management system which is an IBM database management system to manage computerized databases.
14. INSTANTIATE: To create an instance of a class. An "instance"is an object in object-oriented programming, in relationship to the class to which it belongs. For example, an object MYLIST that belongs to a class LIST, is an instance of the class "list".
15. INTERNET BROWSER: An application used to view pages on the World-Wide-Web. Many e-business applications use internet browsers to present their user interface. So it becomes the GUI for such applications. Such applications also make use of a JDBC driver to access data in a database.
16. J2EE APPLICATION: A Java application written to conform to the Java 2 Platform, Enterprise Edition specification.
17. J2EE APPLICATION SERVER: A Java application written to the Java 2 Platform, Enterprise Edition specification. Many e-business applications are written to run within a J2EE application server, which provides a container for such application. A J2EE Application Server accesses database data via a JDBC driver.

18. JAVA APPLICATIONS: An application written in the Java language. The application can access data in a database via the JDBC driver.

19. JAVA CLASS NAME: The name of the Java class used as the type of the value of a column in a result set. The value for said column is made available to a Java program as an instance of said Java class.

20. JAVA CLASS NAME (FOR GIVEN COLUMN IN A RESULT SET): (See JAVA CLASS NAME above)

21. JAVA.SQL.RESULT SET: The full name of the ResultSet class in the Java language.

22. JAVA.SQL.TYPES.OTHER: A value for the JDBC type of a column. This value is defined by the JDBC API specification.

23. JDBC: This acronym indicates Java Data Base Connectivity, which is used to access data in a particular database involved.

24. JDBC API SPECIFICATION: A document from Sun Microsystems, Inc. that describes the JDBC API. This document designated JDBC™ API is the Java™ platform standard call-level API for database access. The document contains the final specification of the core JDBC 2.1 API which is Copyright 1999 by Sun Micro Systems, Inc. 901 San Antonio Road, Palo Alto, Calif. 94303.

25. JDCB DRIVER (13, FIG. 1): Software that implements the JDBC API specification. It provides remote access to database data. That is, that database is on another computer, and JDBC Driver 13 communicates with JDBC driver 18 to provide access to the data in that database.

26. JDBC DRIVER (18, FIG. 1): Software that implements the JDBC API specification and provides access to data in a database.

27. JDBC TYPE: The type, as defined by the JDBC API specification, of a column in a result set.

28. LDAP: This represents lightweight directory access protocol implemented by the IBM Corporation.

29. LOGICAL DATA ACCESS LAYER: A layer of software used to map the physical data, as stored in a database, to a logical view of that data.

30. LOGICAL ENTITY TYPES: Types that do not represent physical storage of data, but rather a rearranging of that data used to represent a specific object model.

31. LOGICAL ENTITY TYPES-ATTRIBUTE NAMES: Names of the attributes of logical entity types.

32. METADATA: This is data about data. For example, the title, subject, author, and size of a file, constitute metadata about the file.

33. METADATA COLLECTION: One or more result set metadata objects that are tracked by a result set object.

34. METADATA VALUE: The metadata associated with a given entity.

35. METAFILE: A file that contains or defines other files. Many operating systems use metafiles to contain directory information about other files on a given storage device.

36. NEWLY CREATED RESULT SET METADATA OBJECT: A result set metadata object that is created to represent the metadata in a result set.

37. NORMAL FASHION (FIG. 3, STEP 44): This represents processes already defined by the JDBC API specification.

38. NT SERVER: A computer running an operation system based on Microsoft's NT technology, such as Windows 2000 or Windows NT 4.0. The Java application JDBC driver (18) and OLE DB data provide (19) all run on this computer.

39. OBJECT: This is designation for object code (machine readable code). In object oriented programming, a variable comprising both routines and data that is treated as a discrete entity.

40. OBJECT MODEL: The structural foundation for an object-oriented language, such as C++. This foundation includes such principles as abstraction, concurrency, encapsulation, hierarchy, persistence, polymorphism, and typing.

41. OLE: This represents object linking and embedding. This is a technology for transferring and sharing information among applications. When an object, such as an image file is created with a "paint" program, it is then linked to a compound document, such as a spreadsheet or a document created with a word processing program, the document contains only a reference to the object; any changes made to the contents of a linked object will be seen in the compound document. When an object is embedded in a compound document, the document contains a copy of the object; any changes made to the contents of the original object will not be seen in the compound document, unless the embedded object is updated.

42. OLE DB DATA PROVIDER: Software that implements the Microsoft OLE DB API specification. It provides the interface between the JDBC driver and the database.

43. PARENT RESULT SET OBJECT: A result set object that contains embedded result set objects.

44. PARENT TABLE: Pertaining or constituting relationship between two nodes in a tree data structure in which the parent is one step closer to the root, that is to say, one level higher than the descendent or child.

45. PHYSICAL TABLES: The actual tables defined in a relational database.

46. QUERY: This is the process of extracting data from a database and presenting it for use. It involves a specific set of instructions for extracting a particular data repetitively through a program sequence.

47. RELATIONAL DATABASE: A database or database management system that stores information in tables—rows and columns of data—and conducts searches by using data in specified columns of one table to find additional data in another table. In relational database, the rows of a table represent records (collections of information about separate items) and the columns represent fields (particular attributes of a record). In conducting searches, a relational database matches information from a field in one table with information on a corresponding field of another table to produce a third table that combines requested data from both tables.

For example, if one table contains the fields EMPLOYEE-ID, LAST-NAME, FIRST-NAME, HIRE DATE—and another table contains the fields DEPT, EMPLOYEE-ID, SALARY,—a relational database can match the EMPLOYEE-ID fields in the two tables to find such information as the names of all employees earning a certain salary on the departments of all employees hired after a certain date. Thus, the relational database uses matching values in two tables to relate information in one table to information in the other table.

48. RESULT SET: A type in the JDBC API used to define data returned by a database in response to a query.
49. RESULT SET.GET OBJECT: A method defined on the ResultSet type used to obtain the value of a column in the current row of the result set.
50. RESULT SET (HIERARCHICAL DATABASE): For a hierarchical database, the data at each level of the hierarchy is represented in Java as a result set.
51. RESULT SET METADATA: A class that defines the metadata associated with a result set.
52. RESULT SET METADATA.GET COLUMN TYPE: A method defined on the ResultSetMetadata class that is used to obtain the JDBC type of a given column in a result set.
53. RESULT SET METADATA OBJECT: An instance of the ResultSetMetadata class.
54. ROW CURSOR: An entity employed by a result set to mark the currently accessed row of a result set.
55. STORAGE (21, FIG. 1): Represents the database, in this case, a hierarchical database. It contains the data being accessed.

DETAILED DESCRIPTION OF PREFERRED EMBODIMENT

Figure 1:
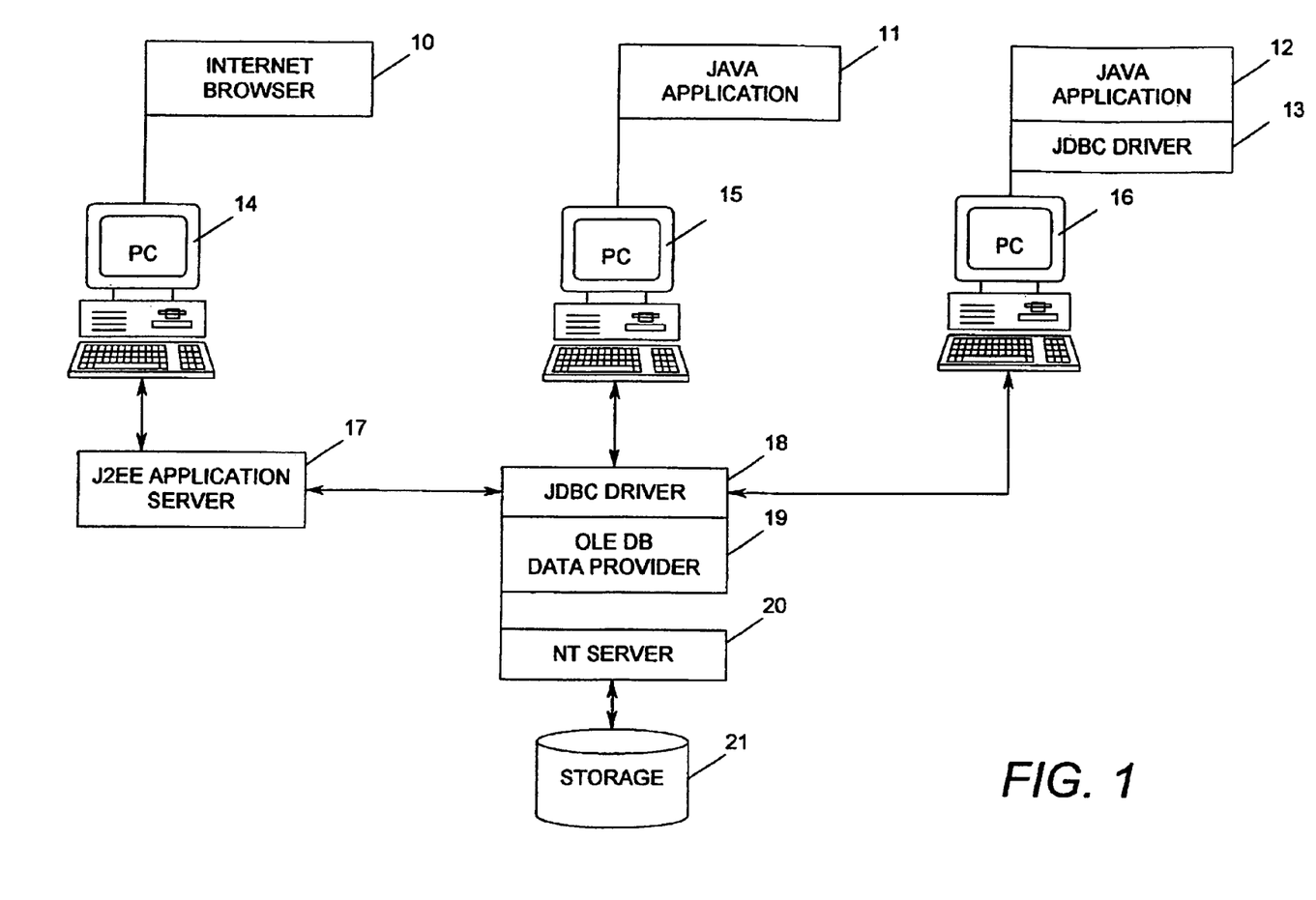
FIG. 1 is a generalized block diagram of a system that may use the method of the present invention.

Referring now to the drawings and FIG. 1 in particular, a block diagram of a system that may use the method of the present invention is shown. PC clients 14, 15, and 16 execute software of various sorts. PC client 14 is executing internet browser software 10, PC client 15 is executing a Java application 11, and PC client 16 is executing a Java application 12 coupled with JDBC driver software 13. The Java application 12 and JDBC driver 13 can run on any computer using any operating system, such as Linux, Windows, Unix, etc, and still gain access to the database data through the JDBC driver on an MS Windows system. NT Server 20 contains a storage device 21, and typically executes software including JDBC Driver 18 and OLE DB data provider 19. PC clients 15 and 16 connect to NT Server 20 via the JDBC driver 18. PC client 14 first connects to a J2EE application server 17 before connecting to NT Server 20 via JDBC Driver 18.

Figure 2:
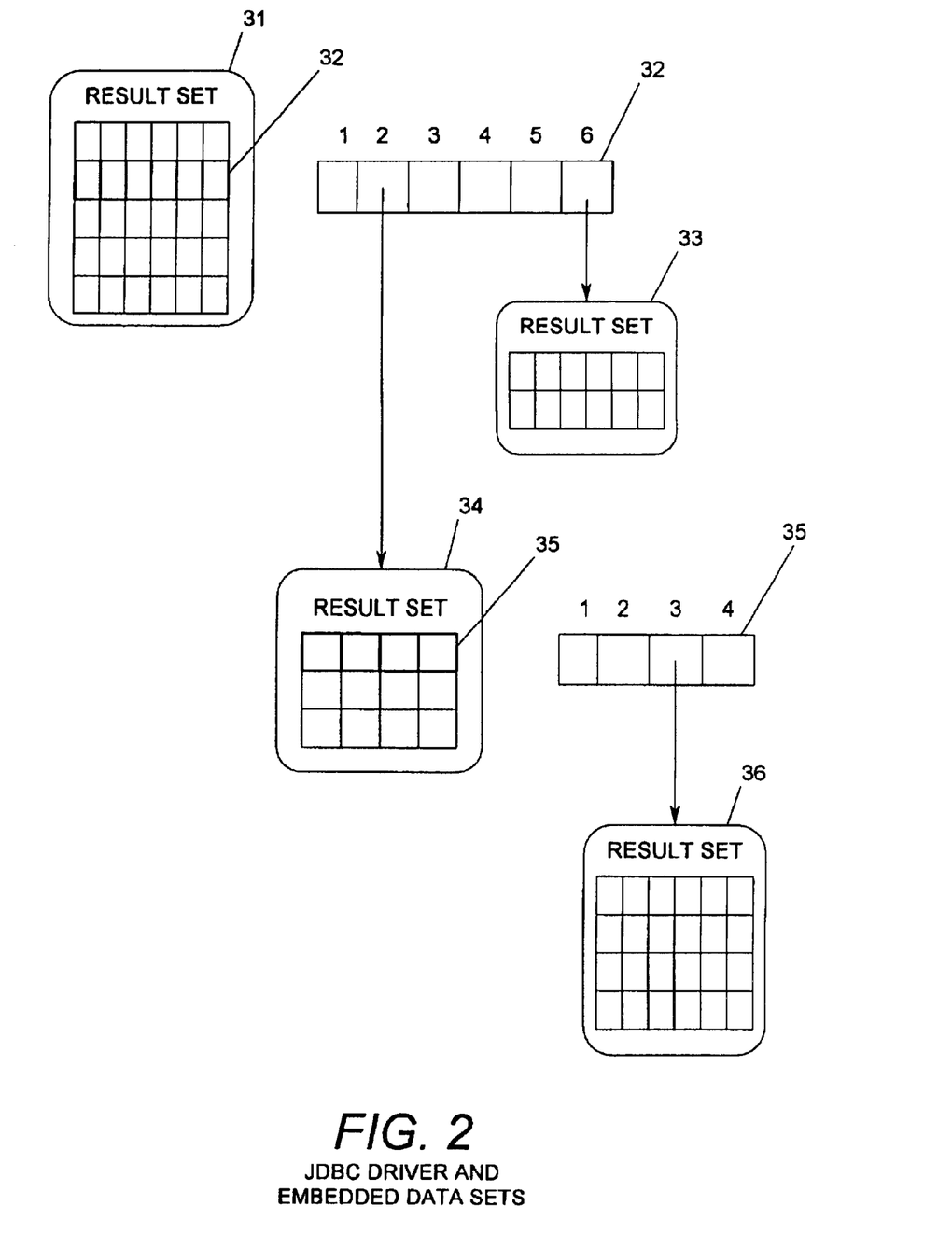
FIG. 2 is a block diagram illustrating the JDBC Driver and embedded result sets.

With reference to FIG. 2, a diagram illustrating the JDBC Driver and embedded result sets is shown. In JDBC, data from the database (i.e. NT Server 20) is returned to the Java application 11 as a result set 31. The result set 31 can be thought of as containing data in a tabular format consisting of columns and rows. The Java application 11 essentially obtains the data from the result set 31 one row at a time. If the result set contains hierarchical data, that data will be presented as a Result Set for the column that contains the hierarchical data. To illustrate this, row 32 (FIG. 2) in Result Set 31 is called out. Row 32 contains hierarchical data in column 2 that is represented as Result Set 34. To obtain the value for column 2, the Java application would use the ResultSet.getobject method, (one of the methods defined in the JDBC API) which would yield a ResultSet object containing ResultSet 32. The Java application treats this "embedded" result set in the same way that it treats any other result set. A particular result set might have multiple embedded result subsets 33 and 34. And, an embedded result set might itself have a further embedded result subset 36 referenced by column 3 in row 35. There is no limit to the depth or breadth of nesting of result sets, often referred to as subsets.

Figure 3:
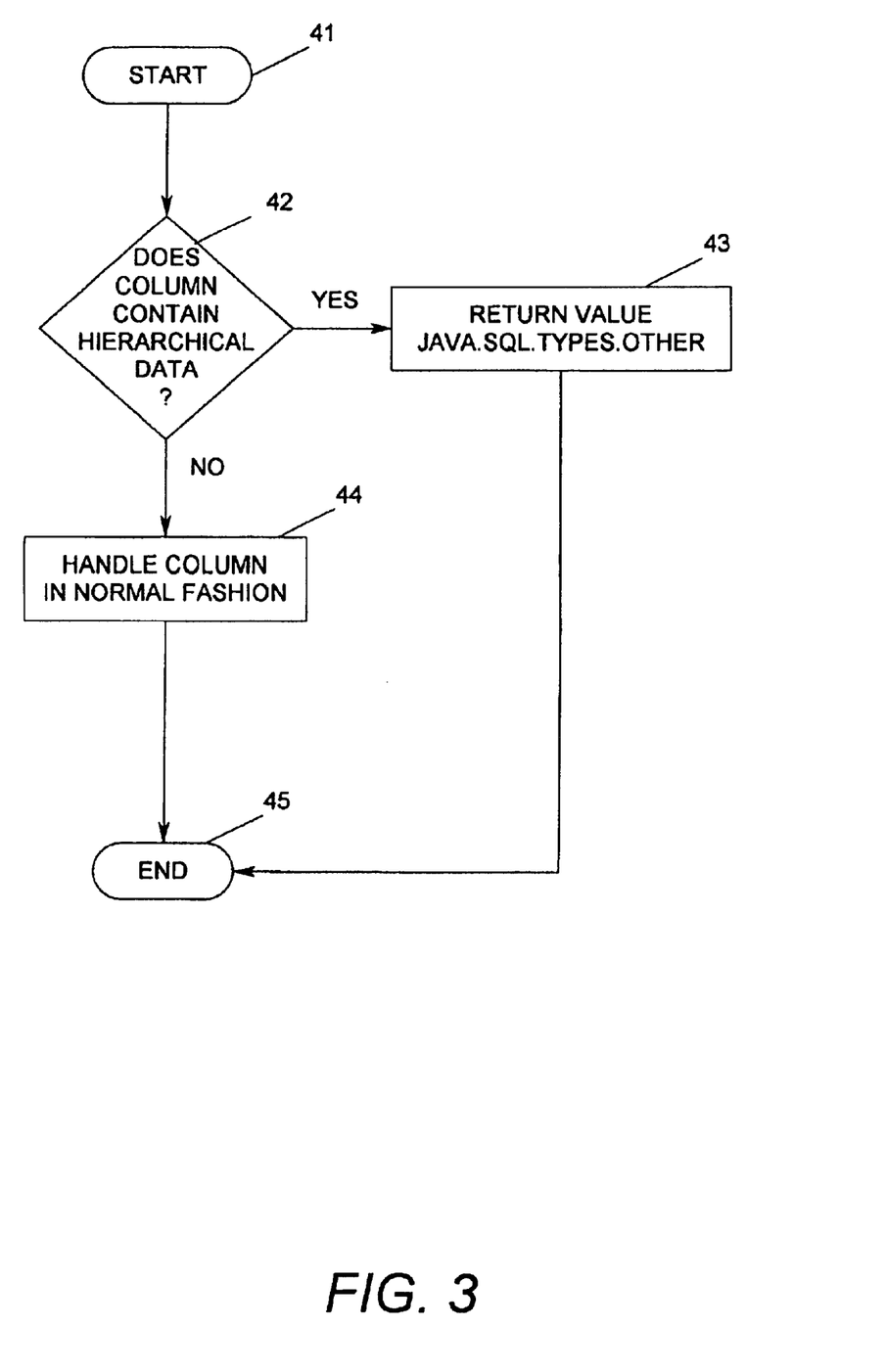
FIG. 3 is a flow chart that illustrates the process of determining the JDBC type for a given column in a result set.

Referring now to FIG. 3, a flow chart that illustrates the process of determining the JDBC type for a given column in a result set is shown. This process in used to determine the "type" of the column to be returned by the ResultSetMetadata.getColumnType method defined in the JDBC API. The process begins with start bubble 41 followed by an inquiry as to whether or not the column contains hierarchical data (diamond 42). If the answer to this inquiry is no, then the column is handled in the normal fashion (block 44). The "normal fashion" refers to the sequence of handling as described in the JDBC specification cited in the Glossary. On the other hand, if the column does contain hierarchical data (YES), the value Java.sql.Types.OTHER is returned as the JDBC type of value in the given column (block 43). The process then exits (bubble 45).

Figure 4:
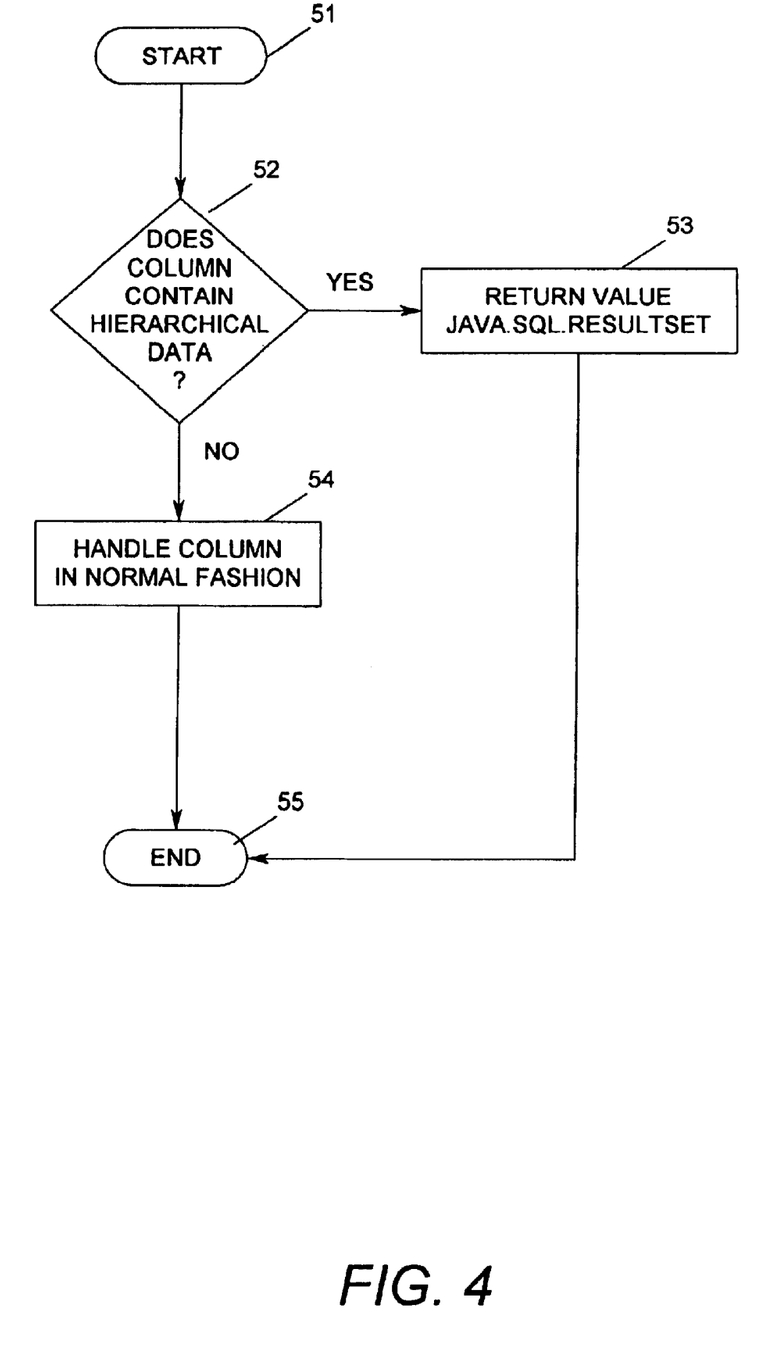
FIG. 4 is a flow chart illustrating the process of determining the Java class name for a given column in a result set.

With reference to FIG. 4, a flow chart illustrating the process of determining the Java class name for a given column in a result set is shown. This process is used to determine the class name to return for the ResultSetMetadata.getTypeName method defined in the JDBC API. The process begins with start bubble 51 followed by an inquiry as to whether or not the column contains hierarchical data (diamond 52). If the answer to this inquiry is no, then the column is handled in the normal fashion (block 54). On the other hand, if the column does contain hierarchical data, the string value "Java.sql.ResultSet" is returned as the Java class name of the value in the given column (block 53). The process then exits (block 55).

Figure 5:
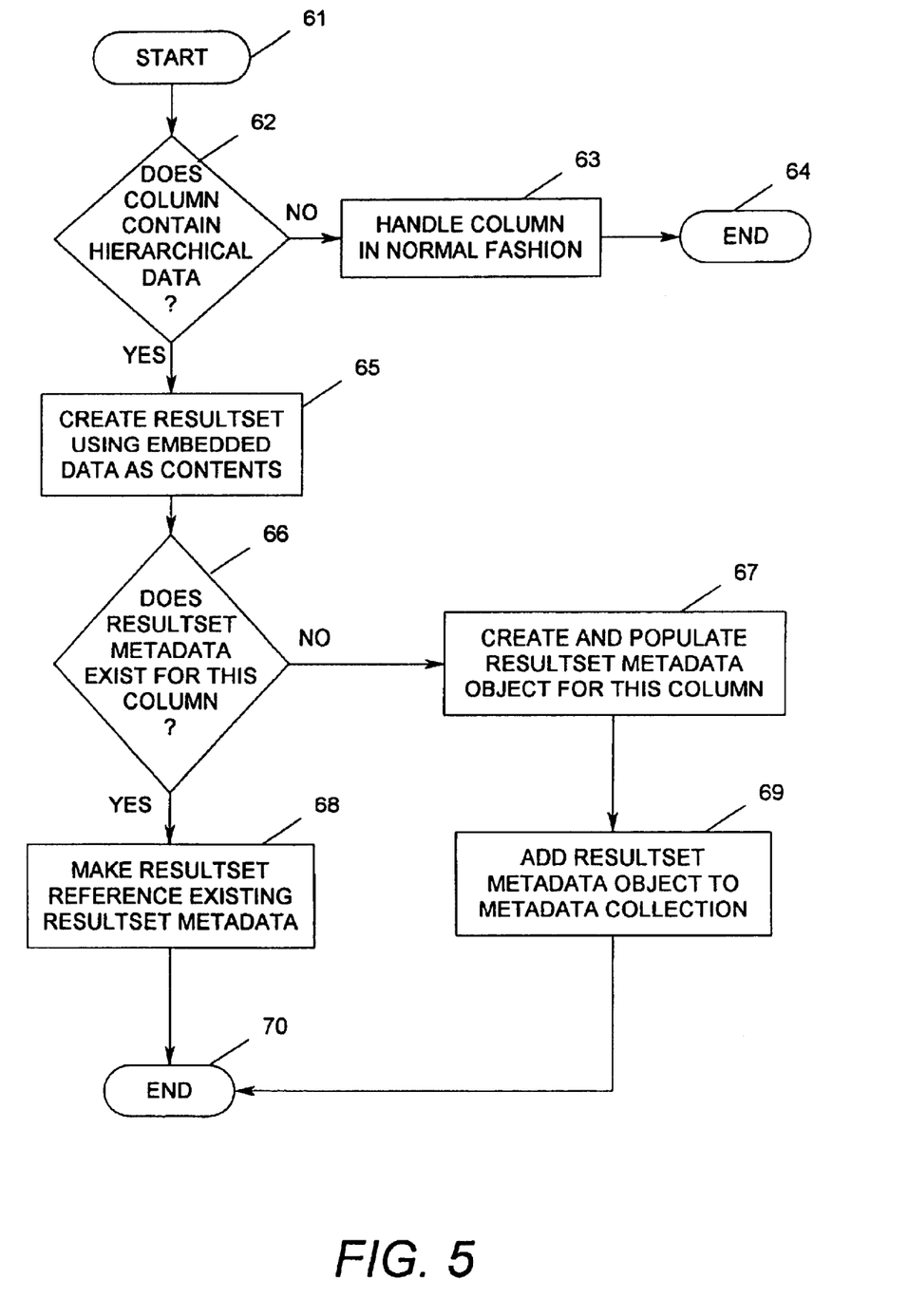
FIG. 5 is a flow chart that illustrates the process of obtaining an embedded Result Set object and its metadata value for a given column in a result set.

Referring now to FIG. 5, a flow chart that illustrates the process of obtaining the value for a given column in a result set is shown. The process begins with start bubble 61 followed by an inquiry as to whether or not the column contains hierarchical data (diamond 62). If the answer to this inquiry is no, then the column is handled in the normal fashion (block 63), and the process exits (bubble 64). On the other hand, if the column does contain hierarchical data (YES), a result set object is created to contain the embedded data (block 65). This result set object is called the embedded result set object. The process continues with an inquiry as to whether or not the result set metadata object for this column already exists (diamond 66). If the answer to this inquiry is yes, the newly created embedded result set object is made to reference the existing result set metadata object for this column (block 68).

It is possible to reuse the result set metadata in this manner because for every row of the result set, the given column will always contain hierarchical data, and the metadata for that data will always be the same.

On the other hand, if the answer to this query (at 66) is no, than a result set metadata object for this embedded result set object is created and populated with the metadata for the hierarchical data (block 67). In addition, the newly created result set metadata object is added to a collection maintained by the parent result set (block 69). This allows the newly created result set metadata object to be reused for additional rows within the same column in the result set. The process then exits (block 70).

Figure 6:
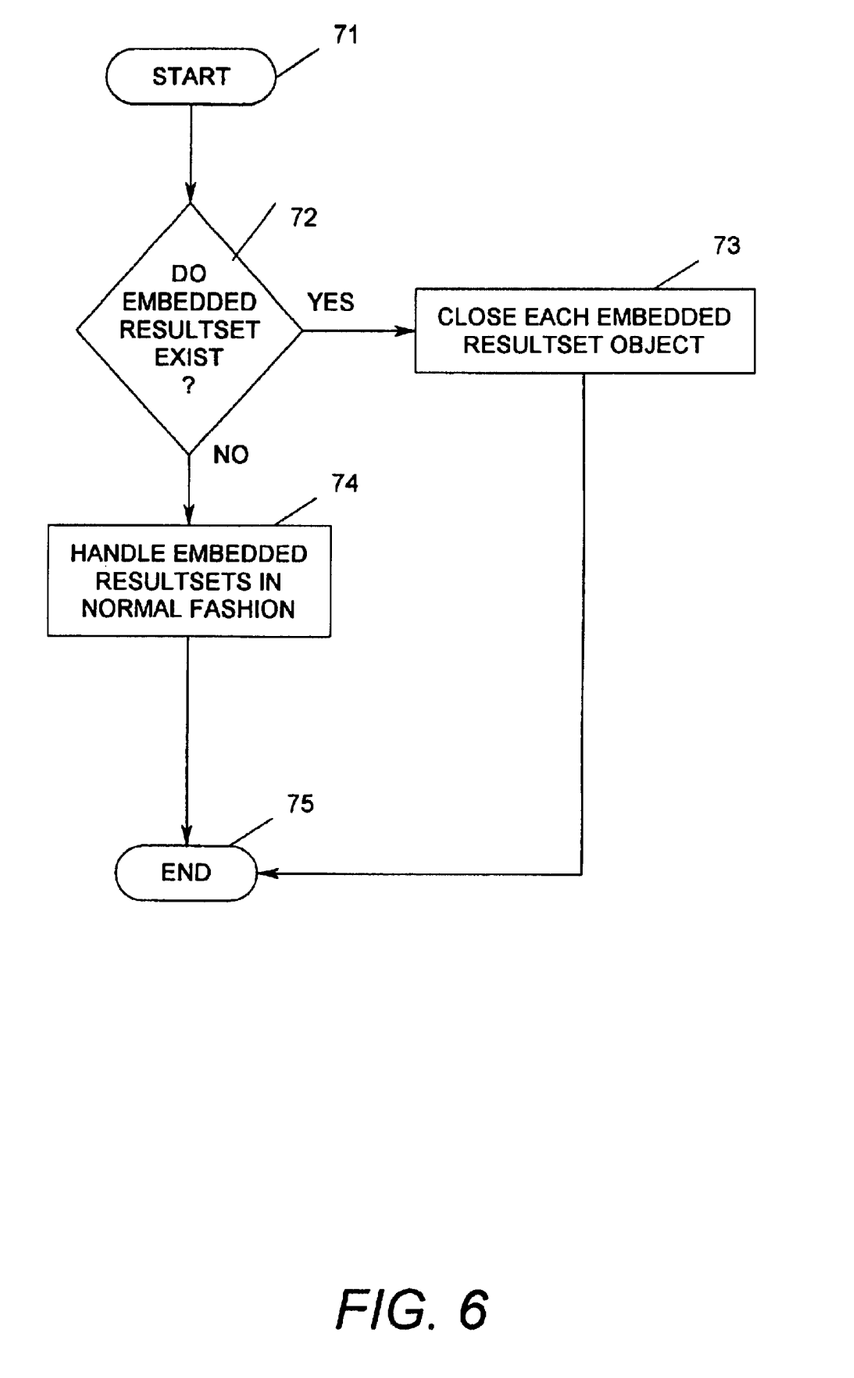
FIG. 6 is a flow chart illustrating the process of closing embedded ResultSet objects when the row cursor is moved via calling a method such as NEXT or PREVIOUS, or when the parent ResultSet object is closed.

With reference to FIG. 6, a flow chart illustrating the process of closing embedded ResultSet objects when the row cursor is moved is shown. The process begins with start bubble 71 followed by an inquiry as to whether or not the parent result set contains embedded result set objects (diamond 72). If the answer to this inquiry is no, then the result set is closed in the normal fashion (block 74). On the other hand, if the result set does contain embedded result set objects (YES), the process continues with a process step (block 73) to close each embedded result set object, thus preventing further access to the data contained in the result set object. The process then continues to close the result set in the normal fashion (block 73). The process then exits (block 75).

The methods and apparatus of the present invention, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

What is claimed is:

1. In a computer system executing a Java application and a hierarchical database, a method for providing data access from said Java application to said hierarchical database, said method comprising the steps oft
    (a) determining a JDBC type for said Java application to represent a column in a result set on said hierarchical database;
    (b) determining a Java class name for said Java application to represent said column;
    (c) creating a Java ResultSet object to represent the data in said column and determining a metadata value for said Java application result set to represent said column;
    (d) closing embedded result set objects for said result set.

2. The method as in claim 1 wherein said step of determining said JDBC type to represent said column further includes the steps of:
    (a) determining if said column contains hierarchical data, and if so;
    (b) setting said JDBC type to "Java.sql.Types.OTHER";
    (c) determining, in step (a) above, that said column does not contain hierarchical data;
    (d) handling said column in a normal fashion for non-hierarchical data.

3. The method as in claim 1 wherein said step of determining said JDBC type to represent said column further includes the steps of:
    (a) determining if said column contains hierarchical data, and if so;
    (b) setting said Java class name type to "Java.sql.ResultSet",
    (c) determining in step (a) above that said column does not contain said hierarchical data; and,
    (d) handling said column in a normal fashion for non-hierarchical data.

4. The method as in claim 1 wherein said step (c) of determining said metadata value to represent said column further includes the steps of:
    (a) determining if said column contains hierarchical data, and if so;
    (b) creating a result set using said hierarchical data as contents;
    (c) determining that said column of step (a) above does not contain hierarchical data and if so;
    (d) handling said column in a normal fashion for non-hierarchical data.

5. The method as in claim 4, which further includes the steps of:
    (a) determining if a result set metadata exists for said column, and if so;
    (b) creating and populating a result set metadata object for said column;
    (c) adding said result set metadata object to a metadata collection;
    (d) determining in step (a) above that said result set metadata does not exist for said column;
    (e) making said result set to reference said existing result set metadata.

6. The method as in claim 1 wherein said step of closing said embedded result set objects for said result set further includes the steps of:
    (a) determining if said result set contains embedded result set objects, and if so;
    (b) closing each of said results set objects;
    (c) determining in step (a) above that said result set does not contain said embedded result set objects, and
    (d) closing said result set in a normal fashion.

7. A storage medium encoded with machine-readable computer program code for providing data access from a Java application to a hierarchical database, wherein, when the computer program code is executed by a computer, the computer performs the steps of:
    (a) determining a JDBC type for said Java application to represent a column in a result set on said hierarchical database;
    (b) determining a Java class name for said Java application to represent said column;
    (c) constructing a result set object to contain the hierarchical data and determining a metadata value for said Java application to represent said column;
    (d) closing embedded result set objects for said result set.

8. The method as in claim 7 wherein said step of determining said JDBC type to represent said column further includes the steps of:
    (a) determining if said column contains hierarchical data, and if so;
    (b) setting said JDBC type to "Java.sql.Types.OTHER";
    (c) handling said column in normal fashion, when it is determined in step (a) above that said column does not contain said hierarchical data.

9. The method as in claim 7 wherein said step of determining said JDBC type to represent said column in a result set further includes the steps of:

(a) determining if said column contains hierarchical data, and if so;

(b) setting said Java class name type to "Java.sql.Result-Set";

(c) handling said column in normal fashion when it is determined in step (a) above that said column does not contain said hierarchical data.

10. The method as in claim 7 wherein said step (c) of determining said metadata value to represent said column in a result set further includes the steps of:

(a) determining if said column contains hierarchical data, and if so;

(b) creating a result set using said hierarchical data as contents;

(c) handling said column in normal fashion, when it is determined in step (a) above that said column does not contain said hierarchical data.

11. The method as in claim 10, further including the steps of:

(a) determining if result set metadata exists for said column, and if so;

(b) creating and populating a result set metadata object for said column;

(c) adding said result set metadata object to a metadata collection;

(d) making said result set reference said existing result set metadata, when it is determined in step (a) above that said result set metadata does not exist for said column.

12. The method as in claim 7 wherein said step of closing said embedded result set objects for said column further includes the steps of:

(a) determining if said result set contains embedded result set objects, and if so;

(b) closing each of said embedded result set objects;

(c) handling said result set in normal fashion, when it is determined in step (a) above that said result set does not contain said embedded result set objects.

13. A system for enabling a Java application for utilizing of JDBC to access data in a hierarchical database comprising (a) first CPU means (14) utilizing an Internal Browser (10) for accessing an application server (17);

(b) said application server (17) communicating with a first JDBC driver (18);

(c) second CPU means (15) utilizing a Java application means for communicating with said JDBC driver (18);

(d) third CPU means utilizing a Java application (12) and a second JDBC driver (13) for communicating with said first driver (18);

(e) OLE DB data provider means (19) for connecting said first JDBC driver (18) to an NT Server means (20);

(f) storage means for holding data in a hierarchical database.

* * * * *